United States Patent
Shepstone et al.

(10) Patent No.: US 10,354,657 B2
(45) Date of Patent: Jul. 16, 2019

(54) SPEAKER RECOGNITION IN MULTIMEDIA SYSTEM

(71) Applicant: BANG & OLUFSEN A/S, Struer (DK)

(72) Inventors: Sven Ewan Shepstone, Struer (DK); Søren Borup Jensen, Struer (DK)

(73) Assignee: BANG & OLUFSEN A/S, Struer (DK)

(*) Notice: Subject to any disclaimer, the term of this patent is extended or adjusted under 35 U.S.C. 154(b) by 0 days.

(21) Appl. No.: 15/540,647

(22) PCT Filed: Feb. 10, 2016

(86) PCT No.: PCT/EP2016/052841
§ 371 (c)(1),
(2) Date: Jun. 29, 2017

(87) PCT Pub. No.: WO2016/128475
PCT Pub. Date: Aug. 18, 2016

(65) Prior Publication Data
US 2017/0372706 A1 Dec. 28, 2017

(30) Foreign Application Priority Data

Feb. 11, 2015 (DK) .................................. 2015 00077
Apr. 13, 2015 (DK) .................................. 2015 00225
Apr. 15, 2015 (DK) .................................. 2015 00230

(51) Int. Cl.
*G10L 15/00* (2013.01)
*G10L 21/00* (2013.01)
(Continued)

(52) U.S. Cl.
CPC .............. *G10L 17/22* (2013.01); *G10L 17/00* (2013.01); *G10L 17/02* (2013.01); *G10L 17/04* (2013.01); *G10L 17/06* (2013.01)

(58) Field of Classification Search
CPC ....... G10L 17/06; G10L 15/063; G10L 17/00; G10L 17/04; G10L 15/16
See application file for complete search history.

(56) References Cited

U.S. PATENT DOCUMENTS 6,457,043 B1 * 9/2002 Kwak ................. H04L 12/1822
  709/202
8,060,366 B1 * 11/2011 Maganti ................ H04L 65/403
  370/260

(Continued)

OTHER PUBLICATIONS

Stafylakis, Themos, et al. "Compensation for inter-frame correlations in speaker diarization and recognition." 2013, Acoustics, Speech and Signal Processing (ICASSP), 2013 IEEE International Conference on. IEEE, 2013.*
Zheng, Rong, et al. "Variational bayes based i-vector for speaker diarization of telephone conversations." Jul. 2014, Acoustics, Speech and Signal Processing (ICASSP), 2014 IEEE International Conference on. IEEE, 2014.*

(Continued)

*Primary Examiner* — Olujimi A Adesanya
(74) *Attorney, Agent, or Firm* — Harness, Dickey & Pierce, P.L.C.; Anthony G. Fussner

(57) ABSTRACT

A method for identifying a user among a plurality of users of a multimedia system comprising extracting an i-vector for the speech utterance using total variability modeling, comparing the extracted i-vector with a collection of i-vector sets in order to identify a target set most similar to the extracted i-vector, and granting access to the multimedia system in accordance with an access profile associated with the identified target set. Further, source variation is minimized by, for each speech utterance acquired using a specific data source, re-centering first-order statistics of the speech utterance around the mean of an informative prior associated with the source, and using the co-variance of the informative prior associated with the source when extracting the i-vector for the speech utterance.

20 Claims, 1 Drawing Sheet

(51) Int. Cl.
  *G10L 25/00* (2013.01)
  *G10L 17/00* (2013.01)
  *G10L 17/22* (2013.01)
  *G10L 17/02* (2013.01)
  *G10L 17/04* (2013.01)
  *G10L 17/06* (2013.01)

(56) References Cited

U.S. PATENT DOCUMENTS

| | | | | |
|---|---|---|---|---|
| 8,510,247 | B1* | 8/2013 | Kane, Jr. | G06N 5/02 706/46 |
| 8,554,559 | B1 | 10/2013 | Aleksic et al. | |
| 9,431,021 | B1* | 8/2016 | Scalise | G10L 21/00 |
| 9,602,295 | B1* | 3/2017 | Weiner | H04M 3/562 |
| 9,858,919 | B2* | 1/2018 | Saon | G10L 15/063 |
| 9,917,833 | B2* | 3/2018 | Gomar | H04W 12/06 |
| 2002/0002465 | A1* | 1/2002 | Maes | G10L 15/065 704/275 |
| 2005/0288805 | A1* | 12/2005 | Moore | H04N 21/4143 700/94 |
| 2008/0162655 | A1* | 7/2008 | Khedouri | G06F 17/30094 709/206 |
| 2012/0257766 | A1* | 10/2012 | Seymour | G11B 19/02 381/86 |
| 2013/0225128 | A1* | 8/2013 | Gomar | H04W 12/06 455/411 |
| 2014/0172430 | A1* | 6/2014 | Rutherford | G06Q 20/20 704/273 |
| 2014/0214420 | A1* | 7/2014 | Yao | G10L 15/063 704/243 |
| 2014/0222428 | A1* | 8/2014 | Cumani | G10L 17/02 704/250 |
| 2014/0278412 | A1 | 9/2014 | Scheffer et al. | |
| 2015/0112684 | A1* | 4/2015 | Scheffer | G10L 17/14 704/257 |
| 2015/0127342 | A1* | 5/2015 | Sharifi | G10L 17/005 704/239 |
| 2015/0154002 | A1* | 6/2015 | Weinstein | G06F 3/167 715/728 |
| 2015/0269931 | A1* | 9/2015 | Senior | G10L 15/063 704/245 |
| 2015/0347734 | A1* | 12/2015 | Beigi | G06F 21/32 713/155 |

OTHER PUBLICATIONS

Chen, Liping, et al. "Minimum divergence estimation of speaker prior in multi-session PLDA scoring." May 2014,Acoustics, Speech and Signal Processing (ICASSP), 2014 IEEE International Conference on. IEEE, 2014.*

Villalba, Jesús. "Unsupervised Adaptation of SPLDA.", Jun. 2013,arXiv preprint arXiv:1511.07421.*

Dehak, Najim, et al, "Cosine similarity scoring without score normalization techniques." Jul. 2010, Odyssey. 2010, pp. 71-75.*

McLaren et al, "Source-normalised-and-weighted LDA for robust speaker recognition using i-vectors." 2011, Acoustics, Speech and Signal Processing (ICASSP), 2011 IEEE International Conference on. IEEE, 2011, pp. 5456-5459.*

Shepstone et al, "Audio-based age and gender identification to enhance the recommendation of TV content." 2013, IEEE Transactions on Consumer Electronics 59.3 (2013): 721-729.*

Shepstone et al, "Using audio-derived affective offset to enhance tv recommendation.", 2010, IEEE Transactions on Multimedia 16.7 (2014): 1999-2010.*

Raina et al, "Constructing informative priors using transfer learning.", 2006, Proceedings of the 23rd international conference on Machine learning. ACM, 2006.*

Shepstone et al, "Demographic recommendation by means of group profile elicitation using speaker age and gender recognition.", 2013, Interspeech. 2013.*

Sandro Cumani et al: "Fast discriminative speaker verification in the i-vector space", Acoustics, Speech and Signal Processing (ICASSP), 2011 IEEE International Conference on, IEEE, May 22, 2011, pp. 4852-4855.

Daniel Garcia-Romero et al: "Analysis of I-vector length Normalization in Speaker Recognition Systems", Dec. 11, 2011, URL:http:www.isr.umd.edu/Labs/SCL/publications/conference/dgromero_is11_1norm_final_.pdf, abstract; figure 1, col. 1-col. 6.

Najim Dehak et al: "Front-End Factor Analysis for Speaker Verification", IEEE Transactions on Audio, Speech and Language Processing, IEEE Service Center, New York, USA, vol. 19, No. 4, May 2, 2011, pp. 788-798,.

International Search Report and Written Opinion for PCT Application No. PCT/EP2016/052841 filed Feb. 10, 2016 (published as WO 2016/128475 on Aug. 18, 2016), dated Mar. 18, 2016, 11 pages.

* cited by examiner

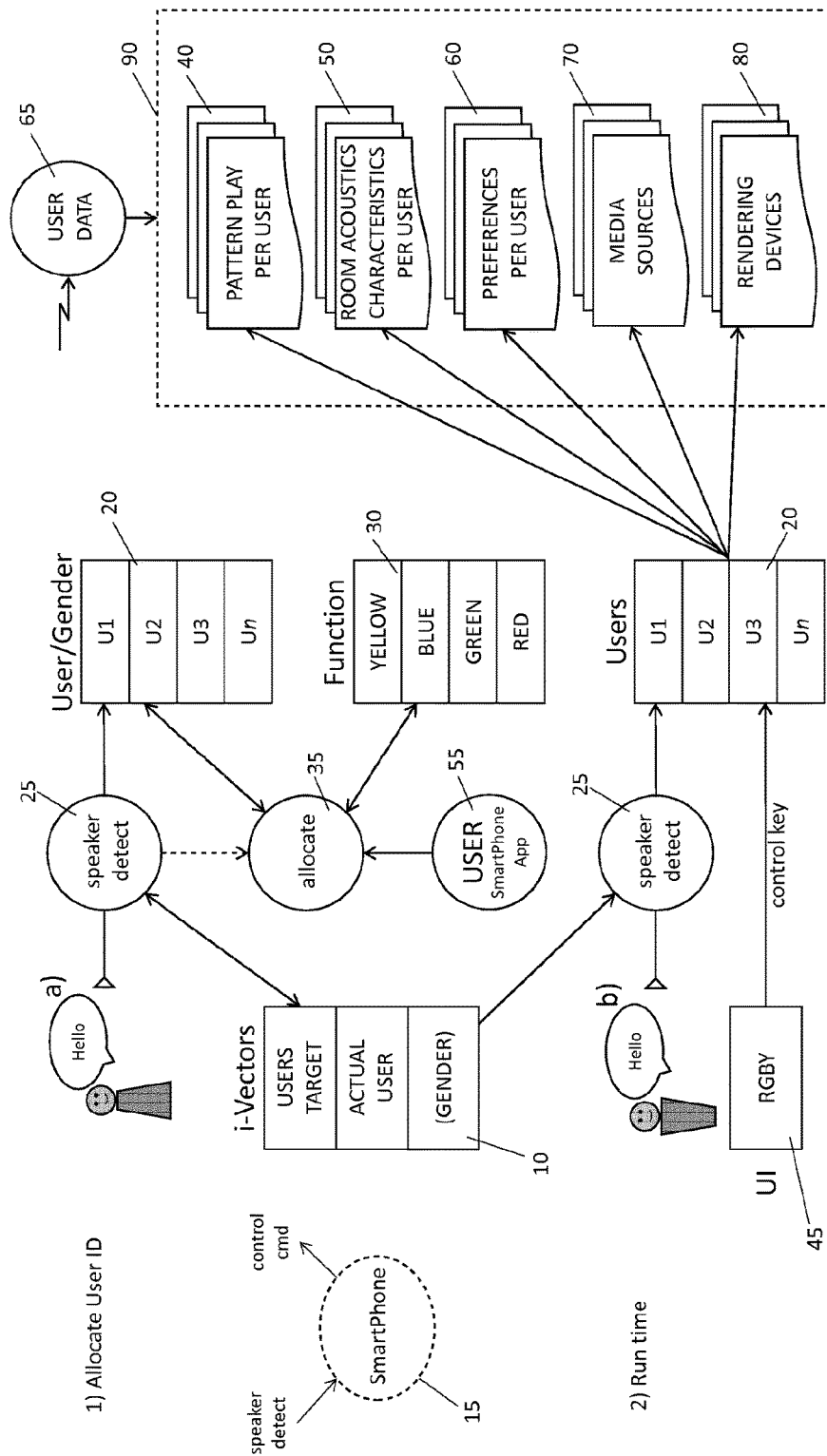

SPEAKER RECOGNITION IN MULTIMEDIA SYSTEM

CROSS REFERENCE TO RELATED APPLICATIONS

This patent application is a U.S. national stage filing under 35 U.S.C. § 371 of International Application No. PCT/EP2016/052841 filed Feb. 10, 2016 (published as WO 2016/128475 on Aug. 18, 2016), which claims priority of Denmark Application No. PA 201500077 filed Feb. 11, 2015, Denmark Application No. PA201500225 filed Apr. 13, 2015, and Denmark Application No. PA201500230 filed Apr. 15, 2015. The disclosures of the applications identified in this paragraph are incorporated herein by reference in their entirety.

FIELD OF THE INVENTION

This invention relates to speaker recognition applied in control and use of multimedia rendering systems, specifically for browsing and selecting media files in a more user friendly mode of operation, and to differentiate among spoken commands given by one or more users.

The present invention also relates to access control to acquire and provide multimedia information offered to individual users from a number of digital data sources. The access control method to be used in a multiple user and multi room environment. A primary aspect of the invention is a method of speaker recognition based on i-vector extraction and validation.

BACKGROUND OF THE INVENTION

Typically, home appliances like AV systems and media servers do not operate in a real multiuser environment. Typically a server/disk having folders with music, movies, photos and other digital files may be accessed unconditionally by all users, all having the same priority and access rights. Everybody may access and process all information like edit files, read files, write/create files, delete files and execute files.

Prior art for a system applicable for multiuser access to—and distribution of multimedia information is disclosed in U.S. Pat. No. 8,924,468.

Prior art for a method for i-vector detection and classification is disclosed in DK PA 201400147.

So far the challenge has been to identify a specific user that might have allocated individual resources. It is very inconvenient to require users to "login on" in an ordinary matter, known from IT systems, to identify themselves.

New methods to identify users via spoken commands and speech recognition is a feasible mode to apply but the existing systems require big resources in terms of online processing in identifying commands and converting these to related control commands.

The i-vector feature extraction approach has been the state-of-the-art in speaker recognition in recent years. The i-vectors capture the total variability, which may include speaker, channel and source variability. Variable-length speech utterances are mapped into fixed-length low dimensional vectors that reside in the so-called total variability space. While it is possible to work directly with the raw i-vector distribution, the fixed-length of i-vectors has resulted in a number of powerful and well-known channel compensation techniques that deal with unwanted channel variability and hence improve speaker recognition performance.

As a good starting point, linear discriminant analysis (LDA) is a non-probabilistic method used to further reduce the dimensionality of i-vectors, which simultaneously maximizes the inter-speaker variability and minimizes the intra-speaker variability. After centering and whitening, the i-vectors are more or less evenly distributed around a hypersphere.

An important further refinement commonly carried out is length normalization, which transforms the i-vector distribution to an (almost) Gaussian distribution that is more straightforward to model. Probabilistic LDA is a generative model that uses a factor-analysis approach to model separately factors that account for the inter-speaker and intra-speaker variation. Many variants of PLDA, in the context of the i-vector approach, have been proposed in prior art.

Another well-known method is within-class covariance normalization (WCCN), which uses the inverse of the within-class covariance matrix to normalize the linear kernel in an SVM classifier. It is typical in i-vector modeling to use multiple techniques in cascade: for example to ensure the Gaussian assumption for PLDA, it is not uncommon to carry out whitening followed by length normalization before the PLDA stage.

Due to the fact that channel variation and source variation both contribute to reducing the ability to discriminate speakers, it is not surprising that the methods proposed to combat channel variation and source variation resemble one another.

When i-vectors are extracted from a heterogeneous dataset, not only will they capture both speaker and channel variability, but also source variation. If this source variation is not dealt with, it will adversely affect speaker recognition performance. The notion of source variation is related to the speech acquisition method (e.g., telephone versus microphone channel types) and recording scenario (e.g., telephone conversation versus interview styles). The various combinations of styles and channel types (e.g., interview speech recorded over microphone channel) form a heterogeneous dataset consisting of relatively homogeneous subsets. In this work, the dataset consists of telephone, microphone (telephone conversation recorded over microphone channel), and interview subsets, or sources.

There have been several proposals to address the issue of source variation within the context of total variability modeling. A phenomenon commonly seen in heterogeneous datasets is the fact that not all sources are equally abundant and most speakers appear in only one of the sources. In the context of LDA, the source variation will be strongly represented and seen as part of the inter-speaker variability and will therefore be optimized in the resulting LDA transform. One proposal to address this issue is to determine a suitable inter-speaker scatter matrix.

For training of the total variability matrix itself, one of the simplest approaches, albeit rather crude, is to simply pool all the training data into a heterogeneous set without distinguishing between microphone and telephone data. A more structured proposal suggests training a supplementary matrix for the microphone subset on top of an already trained total variability matrices on telephone data.

I-vectors are then extracted from a total variability matrix that is formed by concatenating these two matrices. An interesting observation seen with this approach is that the microphone data resides in the combined space defined by the matrix concatenation, whereas the telephone data only resides in the telephone space.

In total variability modeling, a non-informative prior is assumed for the speaker, channel and total variability latent variables, since there is no gain in generality in using an informative prior. This assertion holds at least when a homogeneous dataset is concerned. The notion of informative priors to encode domain knowledge is not a new concept and has been used in machine learning applications before. In the context of continuous speech recognition, informative priors have also been used in the case of sparse data to improve generalization of an infinite structured SVM model.

GENERAL DISCLOSURE OF THE INVENTION

The current invention discloses an improved method for identifying an individual user among a plurality of users for control and use of multimedia rendering systems.

A method for identifying a user among a plurality of users of a multimedia system including one or more devices for providing multimedia content from one or more sources of digital information, in order to provide individually adjusted access and control of multimedia content from the multimedia system, the method comprising the steps of providing a collection of i-vector sets, each i-vector set including i-vectors based on one or more words spoken by a user of the multimedia system and being associated with an access profile of this user, acquiring a speech utterance from a current user, and extracting an i-vector for the speech utterance using total variability modeling, comparing the extracted i-vector with each i-vector set in the collection, in order to identify a target set most similar to the extracted i-vector, granting, to the current user, access to the multimedia system in accordance with the access profile associated with the identified target set, wherein the speech utterance is acquired using one of a plurality of sources. In the total variability modeling, source variation is minimized by:

for each data source, estimating a source-specific informative prior, which is defined by a mean and a covariance, and for each speech utterance acquired using a specific data source, re-centering first-order statistics of the speech utterance around the mean of the informative prior associated with the source, and using the co-variance of the informative prior associated with the source when extracting the i-vector for the speech utterance.

According to an aspect of the present invention a probability distribution of a specific source is estimated from speech data, and subsequently used in the Bayesian sense to annihilate source variability in total variability models. The estimated probability distribution is referred to as a "source specific informative prior". The solution according to the invention enhances performance of i-vector based voice recognition.

According to one approach, an already trained total variability matrix and the standard, non-informative prior are used to extract i-vectors from each subset of the data, and then these i-vectors are used to estimate a source-specific informative prior. The source-specific informative prior is subsequently used in the computation of the posterior probability distribution (referred to as the "posterior") to compute a new set of i-vectors. (The mean of the posterior corresponds to the i-vector.) According to this approach, i-vector extraction using source-specific priors can be used to compensate for unwanted source variability.

According to another approach, the total variability matrix is retrained. Here, the role of the source-specific prior is extended to the computation of the posterior mean and covariance in each Expectation Maximation-step, needed for re-estimating an "informative" total variability matrix for a given training iteration. For each training iteration, a preliminary source-specific prior is computed, and used to update the informative total variability matrix. Once the training has completed, the informative total variability matrix is used to extract i-vectors and estimate a source specific prior according to the first approach. According to this approach, performance of the first approach can be improved by using prior information to improve the initial alignment of the total variability matrix.

According to yet another approach, factor analysis is used for estimating the informative priors. In this approach, both the mean and covariance of the posterior (where again the mean corresponds to the i-vector) are taken into account.

The solution according to the invention may be especially useful in situations where a large number of distinct voices need to be recognized. Such a situation exists e.g. when voice prints (i-vectors) of users are stored in the cloud (together with many others), or when the functionality of the recognition device is extended to include additional users that are not part of a household.

According to one embodiment, the set of target i-vectors and associated access profiles are stored in a remote database and made accessible to more than one multimedia system.

One specific situation involving a large number of distinct users is collaborative filtering for recommendations based on i-vector voice prints. Collaborative filtering means that previous choices of a user are matched with the choices of other users. The user is then provided with content recommendations based on additional choices made by matching users. In collaborative filtering it is desirable to include as many users as possible, and the performance of the voice recognition then becomes crucial. According to one embodiment, content consumption patterns of each user are stored and the current user is provided with recommendations based on choices of other users with similar choices as the current user.

According to yet another embodiment, the method includes providing a set of classes, each class including a set of i-vectors based on speech from users having similar characteristics, and comparing the extracted i-vector with each class to identify a class most similar to the extracted i-vector. Examples of useful characteristics are age, gender, and mood (e.g. "angry", "sad", "neutral", etc). The identification of age, gender and mood can be made each time a user identifies him-/herself.

According to the present invention, a plurality of individual users are offered dedicated access to system resources, like data sources and destination devices, according to predefined rights for accessing the resources as defined per user.

More particularly, the invention enables control of which sources of information an individual user can and may access through a number of devices like gateways, servers, media controllers and rendering on presentation devices like AV systems, remote commanders, cell phones, media players, tablets and smartphones e.g. an IPad and alike.

Accessing media information normally means receiving, reading, and/or transmitting the information for a given purpose, such as experiencing or transporting/moving the media information.

Access rights are applied to determine per user the allowance to access and operate the one or more resources considering the right of other users, who are competing to gain access and control to the same resource.

An access profile may be any type of information describing the user's rights in relation to the device. Such rights may be to turn the device on or off, turn music up/down, change channel/stream.

The access method may include individual settings and related functional capabilities in a multimedia system—per user, this e.g. being, but not limited to:

Sound preferences in a room or in part of a room i.e. a domain; the preferences being rendering type (multi-channel, stereo, omnidirectional sound space), default volume, default filter settings (bass, treble, balance).

Media source preferences and rendering (channel ID, room/domain ID).

Sharing options (private, share per room/domain, share per user).

Use pattern recording (personal, all, per user, per room/domain).

The access rights of individual users to the individual streams may affect the users' right to delete/stop/start/alter a stream. This alteration/deletion or the like may be performed by a destination device, a source of the media information or any other device.

In the present context, media information may be any type of information to be provided to a person, such as audio, video, images/pictures or the like.

A source of digital information may be any source from which digital information may be obtained or accessed: information carriers/stores/SUBSTITUTE SHEET (RULE 26) storages/providers on or accessible via the WWW, intranets, LANs, WANs, storages (hard disc, RAM, ROM, PROM, flash, tape, CD-ROM, DVD, or the like), cameras, microphones or the like.

A destination device may be any type of device adapted to provide media information to a user, such as a TV, audio/video, multimedia systems, a media player, a stereo, a monitor or the like.

In addition the invention supports multimedia systems including distribution of Audio or Audio/video in a multi room concept where two or more users are sharing source— and rendering devices.

Thus, when users are moving around, individual settings related to the individual users may be adapted into an actual use scenario—in a certain room or in a certain part of a room.

According to one embodiment, a new user is identified and registered, only if the i-vector of this new user is sufficiently (according to a predefined threshold) different from all of the previous archived i-vectors. This ensures reliable user identification using voice recognition. The threshold may for example be based on a minimum cosine distance.

According to a further embodiment, the set of i-vectors includes a first i-vector based on one or more words spoken by a first user and associated with a first access profile, and a second i-vector based on one or more words spoken by a second user and associated with a second access profile, and the method further comprises allocating a first user identification to the first user, allocating a second user identification to the second user, identifying the first user as the current user, receiving input from the first user indicating the second user identification, and granting the first user access in accordance with the second access profile. With this approach, one user can access media content in accordance with another user's (e.g. a family member's) access profile.

In this case, each access profile may define user dependent access rights. For example, one user is typically not permitted to modify the preferences of another user.

Each user identification may be allocated to a function key on a device or to a graphical icon on a device.

The identification may be performed by the user activating an element, such as a touch pad, a touch button, a wheel, or the like or enters visual or audio instructions which may be detected and used as an identification. The identification may simply be the information that a presently provided stream is identified, or multiple choices may be provided to the user, one of which is then identified by the user.

In one embodiment, the identifying step comprises also identifying the user by a spoken word said by the user. Usually, this is required for determining the rights of the user. Alternatively, the user may be indirectly identified by e.g. a personal detectable token of the user, or the instruction of the destination device (or the destination device itself) may be specific to the user.

In one embodiment, the one or more source devices are connected to a local network to which one or more of the destination devices are connected. Then, the streams may be provided or transmitted also over this network. This network, naturally, may be wireless and/or via wires.

In addition, one or more source devices preferably are connected to global networks via gateway devices, such as routers, switches, modulators, transceivers or the like adapted to e.g. communicate with the WWW, WANs or the like. In this manner, information from outside the present system may be obtained.

The presence in a room/domain of one or more users may be identified, and the identification may then be used in the access to the one or more source devices and to the one or more destination devices.

In one situation, a user is related to a predetermined portable device outputting a unique identifier, the identifying step comprising identifying the user by the unique identifier. This unique identifier may be output intermittently or when outputting other information or instructions, such as when instructing a destination device or when identifying a stream.

A system may be provided with means for carrying out the method of the first aspect.

In one embodiment of the system, the presence in a room/domain of one or more users is identified, and the identification is used in the access to the one or more source devices and to the one or more destination devices.

Another aspect of the invention involve a method of accessing and controlling media information from one or more sources of digital information through one or more devices providing the content for an individual user among a plurality of users, the method comprising the steps of:

applying a first i-vector related to a first user, and the first i-vector being generated and archived based on one or more words spoken by the first user, and applying a second i-vector related to a second user, and the second i-vector being generated and archived based on one or more words spoken by the second user, and allocating a first user identification to the user related to the first i-vector, and allocating a second user identification to the user related to the second i-vector, and enabling individually the first user and/or the second user access to—and control of available media sources and rendering devices.

Another aspect of the invention involves a method for minimizing source variation in total variability modeling for heterogeneous data (multiple sources), whereby informative priors are used instead of non-informative priors to model each source, and the method is characterized by:

for each source of data, and before extracting I-vectors, an informative prior is estimated, which is defined by its own mean and covariance and where the informative priors are used and where the method of compensation of source variability is broken up into two stages:

Before extracting an I-vector for each speech utterance, in the high-dimensional supervector space, the first-order statistics are re-centered around the source-specific mean;

When extracting an I-vector for each speech utterance, the source-specific covariance of the informative prior is used is used instead of the identity matrix.

BRIEF DESCRIPTION OF THE DRAWINGS

The present invention will be described in more detail with reference to the appended drawings, showing currently preferred embodiments of the invention.

FIG. 1 illustrates speaker detection according to an embodiment of the present invention.

DETAILED DESCRIPTION OF PREFERRED EMBODIMENTS

The overall technology relates to how a multiple number of users may interact with a number of sources of multimedia information, to gain access to, and control of, those sources of information.

The available information to access and control is individual according to predefined access rights and functional features and options per user, and optionally according to a number of preferences defined per user by the user him/herself.

The user may gain access to the source of information and must possess the necessary rights to provide the accessed information onto a destination device, e.g. playing a specific music file (source) on a dedicated set of speakers (destination).

The sources of information may be controlled by the user via wireless and portable remote control devices. An individual user is logically related to one dedicated remote controller; this implies that the remote controller becomes a device that reflects and provides to the specific user, only relevant information according to the user and the user interaction with the subset of the complete system devices, that's under control by the user.

Thus the system enables sources of multimedia information to be accessed and provided to specifically one individual user with the relevant subset of information presented on the destination devices relevant for that user and presented on the remote portable device relevant for that user, and where access to devices are governed by individual user access profiles.

With reference to FIG. 1, an embodiment of the invention will be discussed.

The proposed speaker identification is carried out using the i-vector approach. This consists of an offline enrollment stage (definition mode) and an online stage (run-time mode).

In the offline stage, a total variability matrix is trained using a large amount of neutral speech data. The total variability matrix needs to only be generated once and from there i-vectors can be extracted. The total variability matrix is generated including neutral speech data from a plurality of users (25). The matrix is archived in the i-vector data (10) referred to as "users target".

In the enrollment stage, speaker models are enrolled. For each speaker in the household, a target model (an i-vector) needs to be generated. In a real-world setup, an enrollment process or setup process is proposed. For each individual user an actual i-vector is generated based on a spoken word e.g. "hello". The more speech, the better performance can be obtained. As an example, around one minute of speech per person could be used.

The user is archived in the i-vector data (10) referred to as "actual user".

The means (15,25) generating the i-vector data might be a smartphone including a microphone to detect the speaker and a software package in terms of an "APP" for generating and evaluating the i-vectors (10).

An option in the i-vector processing is that it's possible to deduce the gender of a person male/female or even child/adult from the spoken word given by the user. This can be achieved by storing a set of i-vector classes, each including a set of i-vectors based on speech from users having similar characteristics (age, gender, etc). An extracted i-vector can then be compared to these classes, in order to identify a class most similar to the extracted i-vector. Thereby characteristics such as age, gender, mood, may be determined. Note that age, gender and mood classes can be enrolled prior to the system going into use, whereas users' identities are enrolled on the fly. Age, gender, mood as well as ID are all identified when users access the system using their speech.

In the process of identifying individual users, the first user is allocated user identification U1 in the user/gender table (20). The next user, being different from the first user, is allocated user identification U2 in the user/gender table (20). Succeeding new users, being different from any previous identified users are allocated the next available user ID, e.g. U10.

Command procedures (55) are enabled to edit/delete entries in the user table (20). In addition the command procedures support allocating of functional buttons to the individual user identifications in the function table (30). E.g. the user (55) may allocate user identification U1 to relate a physical button named "yellow", this button being a key on a remote terminal or an icon on a touch screen.

In run-time mode, a user utters a word, e.g. "Hello", and the system determines their target model. First, the unknown person's short speech utterance is converted into an i-vector. This i-vector is then compared to all other speaker's i-vectors in the i-vector space, and the one with the shortest cosine distance is chosen as the target speaker.

By using thresholding, it can relatively easily be determined that a test i-vector relates to an unknown person, e.g. if the cosine distance between the test i-vector and all target i-vectors is larger than a defined threshold $\Theta$. A specific procedure may be implemented for the situation when an unknown person speaks. One alternative is to detect a default profile.

Once the target person has been determined, the remainder of the system (e.g. remote control) can be set up with that person's profile.

The user may activate a functional button—"red/green/blue/yellow" (45) related to his/her user identification (20), and the system will then react accordingly by enabling an entry mode opening for following commands (15) given by the addressed user.

During runtime miscellaneous data (90) might be recorded (65) and managed per user, e.g. but not limited to:

User pattern play recording (personal, all, per user, per room/domain).

Pattern play (40) that records the user behaviour over time, e.g. which media being active, where (room/domain), when, how long time.

Sound preferences (50, 60) in a room or in part of a room i.e. a domain; the preferences being rendering type, e.g. multichannel, stereo, omnidirectional sound space, default volume, default filter settings (bass, treble, balance).

Media source and rendering (70, 80) preferences, e.g. channel ID, in a room/domain ID and to be used as default play list, in a room where the user is present.

Sharing options/preferences (60) e.g. private, share per room/domain, share per user.

The invention is very useful in home appliances where a plurality of users playing in parallel and at the same time share the full set of system features and resources in a secure way, and where rights to source material, and sharing of destination devices are respected in an acceptable manner.

One or more Portable Devices may be present in a room; each of the devices is updated individually and according to the actual user applying the device in question.

Portable devices may communicate to/from destination devices via standard means like infrared, ultra sound signals, Bluetooth or Wireless LAN.

Examples of portable devices are, but not limited to: remote terminals, AV commanders, PDA's, IPods, cell phones, multimedia players and alike.

Examples of the application areas of the invention are, but not limited to: Audio/Video systems, TV's, PC's, Laptops, DVD's, HDD's, SDA's, SSR's, Media players and Servers. The mentioned system devices to handle a plurality of different type of source material, the type of which may be, but not limited to: digital broad cast data, digital TV channels, digital audio channels, pod cast, world-wide-web file archives, and music file providers and video file providers.

In the following, the details of i-vector recognition will be discussed in more detail, with focus on use of predetermined probability distributions (referred to as informative priors) according to the present invention.

The I-Vector Paradigm

The total variability model assumes that a speaker- and channel-dependent GMM supervector m of an utterance is modeled as $$m_i = m_0 + Tw \quad (1)$$

where $m_0$ is the speaker-independent supervector obtained by concatenating the mean vectors from the UBM. The hidden variable w weights the columns of the matrix T to explain the observed deviation from $m_0$. The matrix T is defined to have low rank so as to model the subspace where both the speaker and channel variability (hence the name total variability matrix) correlate the most. The training of the total variability matrix follows the same process as that of training an eigenvoice matrix. The major difference is that utterances from the same speakers are treated individually as unrelated sessions.

Let $\{o_1, o_2, \ldots o_T\}$ represent the feature sequence of a given utterance O. The feature vectors are assumed to be drawn from a GMM with its mean supervector as in (1). For each mixture component c of the GMM, the following Baum-Welch statistics are defined:

$$N(c) = \sum_t \gamma_t(c) \quad (2)$$

where t extends over all frames of an utterance and $\gamma_t(c)$ is the occupancy of frame $o_t$ to the c-th Gaussian. We further denote the centered first-order statistics as $$\tilde{F}(c) = \sum_t \gamma_t(c)(o_t - m_0(c)) \quad (3)$$

Also, let N represent the diagonal matrix whose diagonal blocks are $N(c) \times I$ and let $\tilde{F}$ represent the supervector obtained by concatenating the $\tilde{F}(c)$, where c extends over all mixtures in both cases. In order to extract an i-vector, given an already trained T, we compute the posterior distribution over the latent variable w conditioned on the observations. Assuming a standard normal prior w~N(0;I), the posterior distribution is also Gaussian, as follows $$P(w|O) = N(L^{-1} \cdot T^T \Sigma^{-1} \tilde{F}, L^{-1}) \quad (4)$$

with mean vector $$\phi = L^{-1} \cdot T^T \Sigma^{-1} \tilde{F} \quad (5)$$

and precision matrix $L = (I + T^T \Sigma^{-1} NT$. The i-vector is then given by the mean vector $\phi$ of the posterior distribution. Similar to that of N, the matrix $\Sigma$ in (4) is constructed by having its diagonal blocks made up by the covariance matrices of the UBM.

The prior over the hidden variable w is usually taken to be a standard normal distribution. While it is indeed possible to define an informative prior, this prior can always be absorbed to the global mean vector $m_0$ and the loading matrix T. This step causes the resulting prior to become non-informative, thereby requiring no alteration to (4). As such, there is no compelling reason to use an informative prior at least for the case when the dataset is homogeneous. In the following, we show how informative priors of the form w~$N(\mu_p, \Sigma_p)$ where $\mu_p \neq 0$ and $\Sigma_p \neq I$) could be modelled and used for i-vector extraction, and the benefit of doing so when a heterogeneous dataset is concerned. In the NIST series of speaker recognition evaluations (SREs), for instance, the dataset contains "telephone", "interview" or "microphone" speech sources.

Introducing Informative Priors

An informative prior encodes domain knowledge (i.e., the source variation) by capturing underlying dependencies between the parameters. In this section, we propose using minimum divergence criterion for estimating source-specific priors from a heterogeneous dataset. We then show how to incorporate the informative prior in the i-vector extraction formula.

Minimum Divergence Estimation

Consider the case where individual speech sources (e.g., telephone, microphone, or interview in NIST SRE) forms a relatively homogeneous subset and each speech source has I number of utterances. For each utterance we compute the posterior distribution according to (4) using the already trained T matrix. Given the set of posterior distributions, we seek for a Gaussian distribution $N(\mu_p, \Sigma_p)$ that best describes the I posterior distributions. This could be achieved by minimizing the Kullback-Leibler (KL) divergence of the desired distribution $N(\mu_p, \Sigma_p)$ from all the I posteriors $N(\phi_i, L_i^{-1})$. The closed form solution consists of the mean vector $$\mu_p = \frac{1}{I} \sum_{i=1}^{I} \phi_i \quad (6)$$

and the covariance matrix $$\Sigma_p = \frac{1}{I}\sum_{i=1}^{I}(\phi_i - \mu_p)(\phi_i - \mu_p)^T + \frac{1}{I}\sum_{i=1}^{I}L_i^{-1} \quad (7)$$

Notice that the number of utterances l is generally different for each speech source. The central idea here is to use a single T matrix for all sources of data, where the variability due to the different sources is modeled at the prior. Together, the combination of T and the source-specific priors better models the variation across sources from the heterogeneous dataset.

Notice that the mean $\mu_p$ of the informative prior is given by the average of all the i-vectors belonging to a target set (recall that an i-vector is given by the mean of the posterior distribution). The deviation of the i-vectors from $\mu_p$ forms the empirical term in the covariance $\Sigma_p$, while the second term accounts form posterior covariances of the i-vectors.

Posterior Inference with Informative Prior

We formulate the expression for the posterior distribution for the general case when the informative prior as estimated above is used in place of a non-informative one.

Proposition 1: Consider an informative prior $p(w) \sim \mathcal{N}(\mu_p, \Sigma_p)$ with mean $\mu_p$ and the covariance matrix $\Sigma_p$. The posterior distribution p(w|O) is Gaussian with mean $$\phi = L^{-1}(T^T\Sigma^{-1}\tilde{F} + \Sigma_p^{-1}\mu_p) \quad (8)$$

and precision $$L = T^T N \Sigma^{-1} T + \Sigma_p^{-1} \quad (9)$$

Note that by setting $\mu_p=0$ and $\Sigma_p=0$, the posterior mean $\phi$ (i.e., the i-vector) and precision L reduce to the standard form of i-vector extraction with a non-informative prior as in (4).

Proof. Assume that we have the parameter set (T,Σ), the hidden variable w and the observation O. The log likelihood of O given w and the parameters (T,Σ), can be expressed as the sum of two terms:

$$\log P_{T,\Sigma}(O|W) = G_T + H_{T,\Sigma} \quad (10)$$

where $G_T$ is defined by (3), and $H_{T,\Sigma}$ is defined as $$H_{T,\Sigma} = w^T T^T \Sigma^{-1} \tilde{F} - \frac{1}{2} w^T T^T N \Sigma^{-1} T w \quad (11)$$

Since $G_T$ does not depend on w, this term is not considered further.

Given the mean $\mu_p$ and covariance $\Sigma_p^{-1}$, we express the prior as:

$$p(w) \propto \exp\left(-\frac{1}{2}(w-\mu_p)^T \Sigma_p^{-1}(w-\mu_p)\right) \quad (12)$$

The posterior distribution of w given O could be obtained by taking the product of (11) and (12), as follows:

$$p(w|O) \propto \exp\left(w^T T^T \Sigma^{-1}\tilde{F} - \frac{1}{2}w^T T^T N\Sigma^{-1} Tw - \right. \quad (13)$$

$$\left. \frac{1}{2}(w-\mu_p)^T \Sigma_p^{-1}(w-\mu_p)\right)$$

$$\propto \exp\left(\frac{1}{2}(w-\phi)^T L(w-\phi)\right)$$

with $\phi$ and L in the form as stated above.

Prior-Compensated I-Vector Extraction

In the Bayesian sense, an informative prior increases the prior belief of the location and dispersion of each source in a heterogeneous dataset. We note that a different spread is observed for each source in the i-vector space, as was also reported in prior art. In the case of cross-source trials, the test i-vectors belonging to one source and target i-vector belonging to another can no longer be assumed to lie close to one another, even when representing the same speaker. The implication of applying (8) directly would intensify the difference across speech sources, resulting in poorer performance.

We propose to compensate for the differences across speech sources (e.g., telephone versus microphone) by applying the prior mean and covariance at separate stages in the i-vector extraction phase. More specifically, we project the prior mean to the acoustic space, while the covariance remains intact as part of the prior. The operation of separating the prior mean and covariance is based on the equality of marginalization which we shall now demonstrate.

Proposition 2: Let $\Pi_c$ be the marginal distribution for Gaussian c obtained by modeling $m=m_0+Tw$ with the prior $w \sim N(\mu_p, \Sigma_p)$. For this source, the same marginalization $\Pi_c$ can be realized by modeling $m=m_0+Tw+T\mu_p$ with the prior $w \sim N(0, \Sigma_p)$. This gives the following equality:

$$\Pi(c) = \int N(O \mid m_0(c) + T_c w, \Sigma_0) N(w \mid \mu_p, \Sigma_p) dw \quad (14)$$

$$= \int N(O \mid m_0(c) + T_c\mu_p + T_c w, \Sigma_0) N(w \mid 0, \Sigma_p) dw$$

Comparing the first and second rows of (14), the prior mean $\mu_p$ is brought forward to the conditional density, which describes the acoustic observation O. By doing so, the projection $T_c\mu_p$ of the prior mean imposes a shift on the global mean vector $m_0(c)$. This also gives rise to prior distributions with a common mode at the origin (i.e., zero mean) but different dispersions $\Sigma_p$ for individual sources. Algorithmically, the projection $T_c\mu_p$ is applied on the observation by re-centering the first order statistics $\tilde{F}(c)$, as follows $$\tilde{\tilde{F}}(c) = \sum_t \gamma_t(c)(o_t - m_0(c) - T_c\mu_p) \quad (15)$$

$$= \tilde{F}(c) - N(c)T_c\mu_p$$

In a sense, the re-centering brings heterogeneous sources to a common mode at the origin of the total variability space and allows the priors to differ only with regard to one anothers' covariance.

The proposed prior-compensated i-vector extraction can be summarized into the following steps:

1. Start out with an already trained T matrix. For each source, extract an informative prior $N(\mu_p, \Sigma_p)$ using the minimum divergence estimation as described above.

2. Re-center the first order statistics $\tilde{F}$ around the relevant source-specific mean to give $\tilde{\tilde{F}}$, as in (15).

3. Extract i-vectors, by matching the now zero-mean informative prior $N(\mu_p, \Sigma_p)$ for each source to the relevant re-centered first-order statistics:

$$\phi = L^{-1}(T^T \Sigma^{-1}(\tilde{F} - NT\mu_p)) = L^{-1}(T^T \Sigma^{-1} \tilde{\tilde{F}}) \quad (16)$$

where the precision L is as given in (9).

The person skilled in the art realizes that the present invention by no means is limited to the preferred embodiments described above. On the contrary, many modifications and variations are possible within the scope of the appended claims. For example, details of the multimedia system may be different from the example in FIG. 1.

The invention claimed is:

1. A method for identifying a user among a plurality of users of a multimedia system including one or more devices for providing multimedia content from one or more sources of digital information, the method comprising the steps of:
    providing a collection of i-vector sets, each i-vector set including i-vectors based on one or more words spoken by a user of the multimedia system and being associated with an access profile of this user,
    acquiring a speech utterance from a current user, and extracting an i-vector for the speech utterance using total variability modeling,
    comparing the extracted i-vector with each i-vector set in the collection, in order to identify a target set most similar to the extracted i-vector,
    granting, to the current user, access to the multimedia system in accordance with the access profile associated with the identified target set, the access profile governing access to one or more components of the multimedia system,
    wherein the speech utterance is acquired using one of a plurality of sources, and wherein the method further comprises minimizing source variation in the total variability modeling by:
        for each data source, estimating a source-specific informative prior, which is defined by a mean and a covariance, and
        for each speech utterance acquired using a specific data source, re-centering first-order statistics of the speech utterance around the mean of the informative prior associated with the source, and using the co-variance of the informative prior associated with the source when extracting the i-vector for the speech utterance,
    wherein estimating a source-specific informative prior includes extracting a source specific set of i-vectors from data acquired from the data source, and using the source specific set of i-vectors to estimate the source-specific informative prior,
    wherein extracting a source specific set of i-vectors is done using an informative total variability matrix and a non-informative prior,
    wherein the informative total variability matrix is computed by performing a plurality of training iterations, e.g. expectation maximization training iterations, each iteration including computing a preliminary source-specific informative prior and updating the informative total variability matrix using the preliminary source-specific informative prior,
    wherein the method comprises, upon granting access to the current user to the multimedia system in accordance with the access profile associated with the identifed target set, accessing personal settings associated with the current user in order to provide the current user with individually adjusted access and control of multimedia content from the multimedia system.

2. The method according to claim 1, wherein extracting a source specific set of i-vectors is done using a pre-trained total variability matrix and a non-informative prior.

3. The method according to claim 1, further comprising storing the collection of i-vector sets and associated access profiles in a remote database and making them accessible to more than one multimedia system.

4. The method according to claim 3, further comprising storing content consumption patterns of each user and providing the current user with recommendations based on choices of other users with similar choices as the current user.

5. The method according to claim 1, further comprising:
    providing a collection of i-vector classes, each i-vector class including a set of i-vectors based on speech from users having similar characteristics, and
    comparing the extracted i-vector with each i-vector class to identify an i-vector class most similar to the extracted i-vector.

6. The method according to claim 5, wherein the characteristics include at least one of age, gender, and mood.

7. The method according to claim 1, further including identifying and registering a new user only if an i-vector extracted from a speech utterance of the new user is sufficiently different from all previously stored i-vectors according to a predefined condition.

8. The method according claim 7, wherein the condition is based on a cosine distance between the extracted i-vector and all previously stored-i-vectors.

9. The method according to claim 1, wherein the collection of i-vector sets includes a first i-vector set based one or more words spoken by a first user and associated with a first access profile, and a second i-vector set based on one or more words spoken by a second user and associated with a second access profile, and further comprising:
    allocating a first user identification to the first user;
    allocating a second user identification to the second user;
    identifying the first user as the current user;
    receiving input from the first user indicating the second user identification; and
    granting the first user access in accordance with the second access profile.

10. The method according to claim 9, wherein each access profile defines user dependent access rights.

11. The method according to claim 9, wherein each user identification is allocated to a function key, such as a button on a physical device or a graphical image/icon on a virtual device.

12. The method according to claim 11, wherein said database is remote to said multimedia system, and shared by several multimedia systems.

13. The method of claim 1, wherein the personal settings and related functional capabilities in the multimedia system include one or more of:
    sound preferences in a room or domain or part thereof, the sound preferences including rendering type such as multichannel, stereo, and/or omnidirectional sound space, default volume, and default filter settings for bass, treble, and balance;
    media source and rendering preferences, the media source and rendering preferences including channel ID and/or room/domain ID;

sharing options, the sharing options including private, share per room/domain, and/or share per use; and/or use pattern recording, the use pattern recording including personal, all, per user, and/or per room/domain.

14. The method of claim 1, wherein the method comprises recording and/or managing data per user including one or more of:

user pattern play recording, the use pattern recording including personal, all, per user, and/or per room/domain;

pattern play recording, the pattern play recording including recording user behavior over time such as which media is active, where is the media active, and length of time the media was active;

sound preferences in a room or domain or part thereof, the sound preferences including rendering type such as multichannel, stereo, and/or omnidirectional sound space, default volume, and default filter settings for bass, treble, and balance;

media source and rendering preferences, the media source and rendering preferences including channel ID and/or room/domain ID; and sharing options/preferences, the sharing options/preferences including private, share per room/domain, and/or share per user.

15. The method of claim 1, wherein the granting comprises providing multimedia information specifically to an individual user with a relevant subset of the multimedia information presented on destination devices and a remote device relevant to the user, where access to the devices is governed by the user's access profile.

16. The method of claim 1, wherein the granting comprises providing multimedia information specifically to an individual user with a relevant subset of the multimedia information presented on destination devices relevant to the user, where access to the destination devices is governed by the user's access profile.

17. A multimedia system comprising:
one or more sources of digital information,
one or more devices for providing multimedia content from the sources,
a database storing a collection of i-vector sets, each i-vector set including i-vectors based on one or more words spoken by a user of the multimedia system and being associated with an access profile of this user,
a plurality of speech recording data sources,
processing circuitry configured to:
extract an i-vector for a speech utterance acquired from one of said data sources using total variability modeling, while minimizing source variation by:
for each data source, estimating a source-specific informative prior, which is defined by a mean and a covariance, and
for each speech utterance acquired using a specific data source, re-centering first-order statistics of the speech utterance around the mean of the informative prior associated with the source, and using the co-variance of the informative prior associated with the source when extracting the i-vector for the speech utterance,
compare the extracted i-vector with each i-vector set in the collection, in order to identify a target set most similar to the extracted i-vector, and
grant, to the current user, access to the multimedia system in accordance with the access profile associated with the identified target set;
wherein estimating a source-specific informative prior includes extracting a source specific set of i-vectors from data acquired from the data source, and using the source specific set of i-vectors to estimate the source-specific informative prior,
wherein extracting a source specific set of i-vectors is done using an informative total variability matrix and a non-informative prior,
wherein the informative total variability matrix is computed by performing a plurality of training iterations, e.g. expectation maximization training iterations, each iteration including computing a preliminary source-specific informative prior and updating the informative total variability matrix using the preliminary source-specific informative prior,
wherein the processing circuitry is configured to access personal settings associated with the current user in order to provide individually adjusted access and control of multimedia content from the multimedia system.

18. The system of claim 17, wherein the personal settings and related functional capabilities in the multimedia system include one or more of:

sound preferences in a room or domain or part thereof, the sound preferences including rendering type such as multichannel, stereo, and/or omnidirectional sound space, default volume, and default filter settings for bass, treble, and balance;

media source and rendering preferences, the media source and rendering preferences including channel ID and/or room/domain ID;

sharing options, the sharing options including private, share per room/domain, and/or share per user; and/or use pattern recording, the use pattern recording including personal, all, per user, and/or per room/domain.

19. The system of claim 17, wherein the processing circuitry is configured to, in connection with the granting, provide multimedia information specifically to an individual user with a relevant subset of the multimedia information presented on destination devices and a remote device relevant to the user, where access to the destination devices and the remote device is governed by the user's access profile.

20. The system of claim 17, wherein the processing circuitry is configured to, in connection with the granting, provide multimedia information specifically to an individual user with a relevant subset of the multimedia information presented on destination devices relevant to the user, where access to the destination devices is governed by the user's access profile.

* * * * *